July 1, 1930. T. O. PERRY 1,768,711
REGENERATING MECHANISM FOR WATER SOFTENING ZEOLITES
Filed Oct. 27, 1926  2 Sheets-Sheet 1
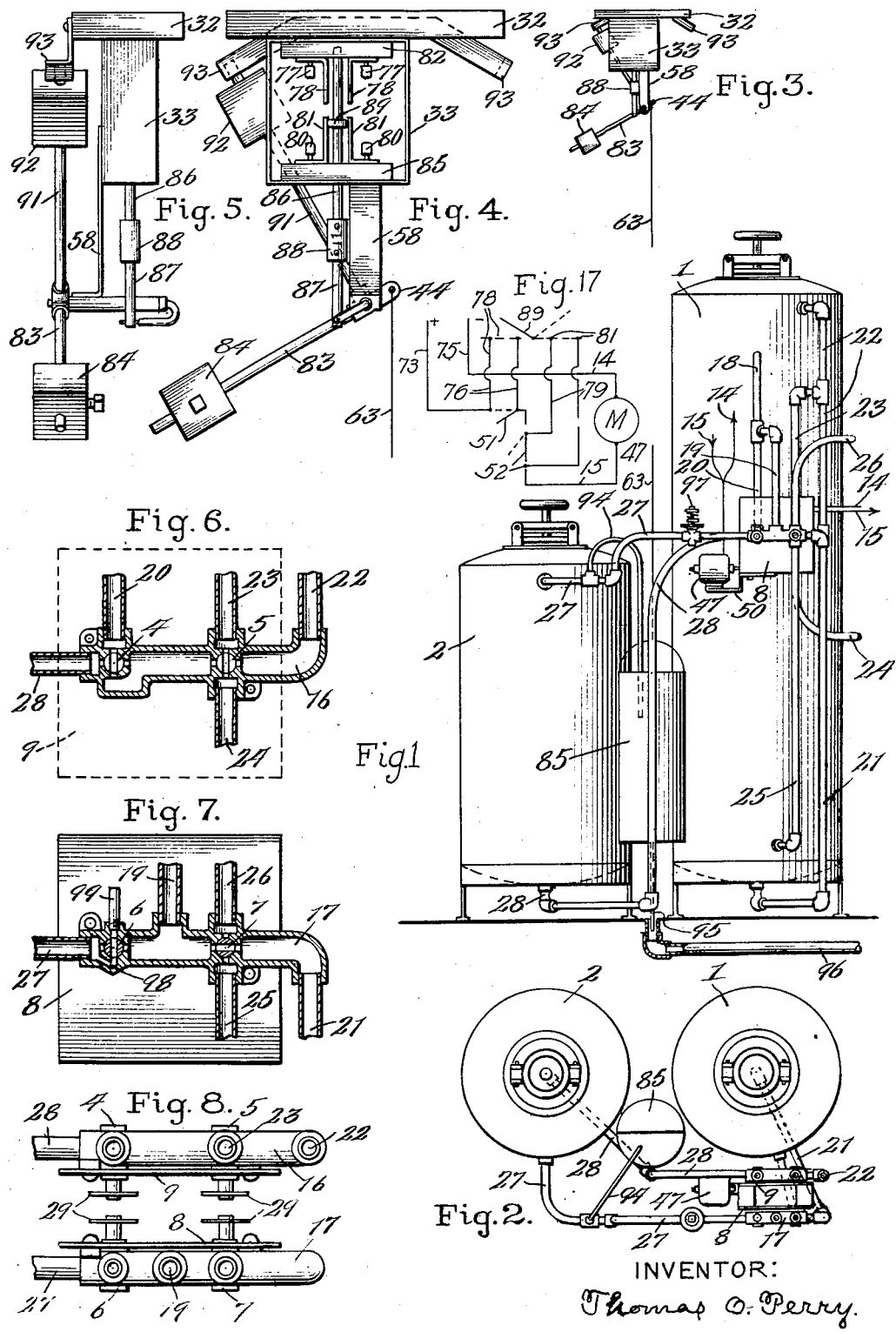
INVENTOR:
Thomas O. Perry.

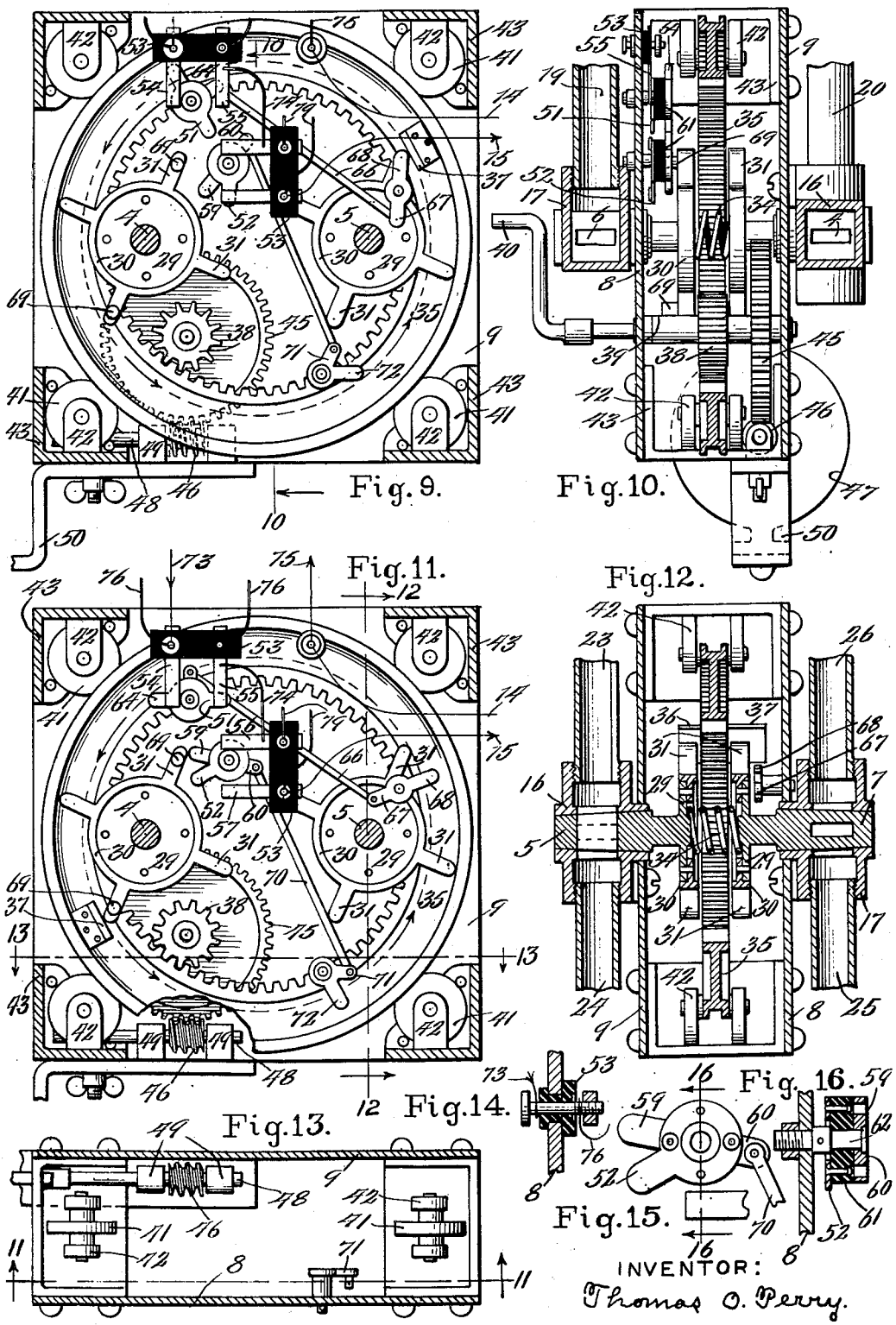

Patented July 1, 1930

1,768,711

UNITED STATES PATENT OFFICE

THOMAS O. PERRY, OF OAK PARK, ILLINOIS; THE NORTHERN TRUST COMPANY, EXECUTOR OF SAID THOMAS O. PERRY, DECEASED

REGENERATING MECHANISM FOR WATER-SOFTENING ZEOLITES

Application filed October 27, 1926. Serial No. 144,628.

The invention relates to improvements in mechanism for regenerating zeolites such as are commonly used for removing the lime and magnesia from hard water by chemical exchange of these elements for an alkali element in the zeolite which in the exchange becomes charged with lime and magnesia. The process involves filtering the hard water through a deep bed of zeolite prepared in the form of flinty gravel-like granules inclosed in a suitable tank. After the zeolite has become overcharged with the lime and magnesia it loses its softening quality and requires restoration of the alkali element which has been lost. For this purpose a solution of common salt, chloride of sodium, is commonly used in the form of a brine which in turn is allowed to filter through the zeolite bed after shutting off the hard water. The chlorine of the salt unites with the lime and magnesia forming a solution which must be washed out before the softening or hard water can be resumed.

With various modifications, the process as above briefly outlined has come into extensive use and has had wide publication. The object of our invention is to facilitate the essential steps enumerated so as to save time, bother and salt.

Our mechanism is illustrated by the accompanying drawings wherein—

Fig. 1 shows in elevation a general view including the tank 1, which contains the deep bed of zeolite with inlet and outlet pipes for passage of water and brine, a storage tank 2, supplied with a solution of common salt and other auxiliaries;

Fig. 2 is a plan of the parts shown in Fig. 1;

Fig. 3 shows, as attached to a ceiling, a bypass switching device for control of the electric motor 47, located on Fig. 1;

Fig. 4 is an enlarged view of the by-pass switches showing details;

Fig. 5 is a side view of Fig. 4;

Fig. 6 is an enlarged elevation of the service cocks 4 and 5 and pipe connections;

Fig. 7 is an enlarged elevation of the service cocks 6 and 7 and pipe connections;

Fig. 8 is an enlarged plan of the casing plates 8 and 9, sleeve castings 16 and 17 and service cocks 4, 5, 6 and 7, also shown in Fig. 2;

Fig. 9 is a further enlarged elevation showing mechanism within the casing plates 8 and 9;

Fig. 10 is a sectional side view of Fig. 9 taken at the broken line 10 looking towards the left;

Fig. 11 is a similar enlarged elevation of mechanism between the casing plates 8 and 9 showing the same parts as in Fig. 9, but in different operating relation;

Fig. 12 is a sectional side view of Fig. 11 taken at the broken line 12, looking towards the right;

Fig. 13 is a sectional plan of Fig. 11 taken below the broken line 13;

Fig. 14 shows a still further enlarged insulated electric wire connection through the casing plate 8;

Fig. 15 is an enlarged elevation of the secondary electric switch 52 and trip levers combined;

Fig. 16 is a sectional side elevation of Fig. 15 taken at the broken line 16, looking towards the left. The primary switch 51 has similar construction and connections;

Fig. 17 is a wiring diagram of the motor circuit.

The tank 1 contains the deep bed of zeolite superposed over a layer of gravel in the ordinary way well known in the art, through which hard water is filtered upwardly, in this case, and is delivered in softened condition from the top of the tank. In the regenerative process it is preferred to direct the flow of brine and subsequent cleansing water through the zeolite bed from above downward, delivering the waste from or near the lower end of the tank. After the cleansing is completed the former order of flow for softening is resumed.

For directing and controlling the flow of water and brine four separate cocks are employed arranged in pairs on two axial lines parallel with each other and at a convenient distance apart as shown at 4, 5, 6 and 7. Each of the four cocks is of the ordinary plug variety having a single diametrical passageway for fluid, is slightly tapered longitudinally and fits into a corresponding cylindrical seat. Each cylindrical seat is provided with four ports, all in the same plane, two of the ports being in line at right angles to the other two. See Figs. 6 and 7. The two cylindrical seats for cocks 4 and 5 are combined for convenience in one sleeve-casting 16, and the cocks 6 and 7 are both seated in the sleeve-casting 17. Sleeve-casting 16 has four pipe connections as shown in Fig. 6 and sleeve-casting 17 also has four pipe connections as shown in Fig. 7, which convey fluid to or away from tank 1 only. Referring to Figs. 1, 2, 6, 7 and 8, of which Fig. 8 will be recognized as an enlargement of some of the parts of Fig. 2, 18 is the main supply inlet for hard water. 19 is a branch pipe through which all the hard water to be softened passes. 20 is a branch pipe for cleansing water. 21 leads to the bottom of tank 1. 22 leads to the top of tank 1. 23 is a branch from pipe 22, to cock 5, through which softened water enters the outlet pipe 24. 25 is the waste pipe for brine and cleansing water which, when cock 7 is reversed, flows into the sewer through pipe 26. Pipe 27, when cocks 6 and 7 are reversed, admits hard water to the top of brine tank 2, producing pressure on top of the brine, and pipe 28 leads from the bottom of the brine tank to supply regenerating brine when cocks 4 and 5 are reversed.

For manipulating the four cocks, instead of the ordinary handles, circular flanges 29 terminate the larger ends of the tapered plugs and to these flanges 29 are riveted to flanged rims 30, each of which has four external radial prongs 31, equally divided about the periphery. The prongs of cocks 4 and 5 revolve in a common plane and the cocks 6 and 7 also have a common plane of revolution. The sleeve castings containing the cocks are secured to two parallel supporting plates 8 and 9 separated from each other by a considerable interval, the plates having perforations through which the flanged ends of the cocks protrude into the space between the plates. The prongs of cocks 4 and 6 face each other with their axes in line and cocks 5 and 7 also have their axes in line facing each other. A helical spring 34 is interposed between the flanged ends of each pair of cocks to insure seating of the cocks with proper uniform pressure. The cocks which face each other always revolve in unison with prongs always mutually parallel so that the intervening spring is never subjected to torsion. The flow passages of cocks 4 and 6 are always kept parallel and the flow passages of cocks 5 and 7 are always at right angles to each other.

An actuating gear wheel 35 having internal teeth is made to rotate about an axis midway between and parallel to the axes of the two pairs of cocks so that the prongs of cocks 4 and 5 approach one side of the wheel and the prongs of cocks 6 and 7 approach the other side. A spur 36 riveted to the outer rim of the actuating wheel projects sufficiently to engage the prongs of cocks 4 and 5 and a similar spur 37 as shown in Figs. 9, 11 and 12, but a little longer, is secured exactly opposite on the other side of the wheel for similarly engaging the prongs of cocks 6 and 7. The actuating wheel is adapted to revolve anti-clockwise as shown, though it could just as easily be adapted to go in the reverse direction. As the wheel rotates through a complete revolution the two pairs of cocks are successively turned each one quarter of a full revolution bringing the passageways at right angles to their previous direction. If the wheel makes a complete revolution, all of the cocks have their passageways changed with reference to their ports. A half revolution of the actuating wheel changes the direction of the flow only in the two cocks of whichever pair is passed by the spurs. After a spur has just reversed a cock, further movement of the wheel short of a complete revolution will not change the cock's relationship with reference to its ports.

Fig. 9 shows the initial position of the spurs 36 and 37 during normal use while softened water flows from the top of tank 1, though the spurs may be advanced from this position nearly one quarter turn of the wheel without detriment. When a test shows that the zeolite needs regenerating, the actuating wheel should be given one complete revolution from the position shown. This one revolution reverses all four of the cocks by giving them each one quarter of a turn from the positions shown in Figs. 6 and 7. The result is that hard water is turned off from tank 1, and turned on to the top of brine tank 2 by the reversal of cocks 6 and 7. Hard water is also shut off from sleeve casting 16, and brine is allowed to flow in by cock 4. Outflow of soft water from tank 1 is stopped and brine is admitted at the top by the reversal of cock 5, and a waste passage for brine from near the lower end of tank 1 was opened when inflow of water at the bottom was shut off by cock 7.

After enough brine has flowed downward through the zeolite to effect regeneration, which usually requires only a few minutes, the actuating wheel is given a half revolution to the position shown in Fig. 11. This half revolution restores the cocks 4 and 6 to their original or normal position, with the result that flow of brine is replaced by that of hard water which flows downward through the zeolite and runs to waste the same as did the brine. After hard water has run to waste sufficiently for cleansing the zeolite thoroughly of brine, the actuating wheel is given another half revolution which completes the restoration of all four cocks to their original position as shown in Figs. 6 and 7, and normal softening of water is resumed.

For driving the actuating wheel a pinion 38 is provided which meshes with the internal teeth of the wheel and is mounted on an axle 39, having its bearings in the supporting plates 8 and 9, through one of which the axle protrudes sufficiently for attaching a crank 40. Instead of mounting the actuating wheel on a central axle with radiating spokes, it is preferred to hold and guide the wheel by means of four guide rollers 41 whose peripheries fit into an external groove extending around the periphery of the wheel as shown in Figs. 9, 10, 11 and 12. The roller axles have their bearings 42 attached to bracket-castings 43, which are secured between the corners of the supporting plates 8 and 9. This arrangement favors compactness and does not interfere with the use of cock-springs 34, which are regarded as matters of importance.

In order to still further reduce the perplexity and attention which usually attends the separate manipulation of several disconnected valves, we have provided a motor 47 with auxiliary devices which render the regenerating process automatic after the motor is given an initial start. On the same axle which holds the pinion 38 is mounted a wormwheel 45 which is driven by a worm 46, directly connected with a small electric motor through a worm shaft 48 forming an extension of the motor shaft. The worm shaft has its bearings 49 attached to the motor bracket 50 which is in turn bolted beneath one of the corner bracket-castings 43 in a detachable manner. Current is supplied to the motor through a primary switch 51 and a secondary switch 52, both of which are mounted on the supporting plate 8. Each switch may make or break connection between two flexible contact strips which are insulated from each other and from the supporting plate by insulating blocks 53. Strips 54 and 56 are in constant frictional contact with the switches 51 and 52 which make and break contact with strips 55 and 57 by pivotal movement. Switches 51 and 52 are both alike in form with a single contact arm projecting radially as shown in Fig. 15 which shows switch 52 connected to a trip lever of similar shape but thicker and having two opposite radial arms 59 and 60. The switch is concentrically attached to the trip lever but insulated therefrom by a thick insulating button 61 as shown in Fig. 16 which is a sectional view of Fig. 15 on the line 16. The switch is also insulated from the pivot stud 62 as shown in Fig. 16. Primary switch 51 is attached to a trip lever and to a pivot stud in precisely the same way as switch 52, but the arms of the primary lever are radially at right angles to each other. The trip arm 64 is engaged by the actuating spur 37 while passing in the same manner as the cock prongs 31 are actuated, for which purpose this spur is made longer than the opposite spur 36. The switch is shown opened in Fig. 9 and closed in Fig. 11 after passage of the spur. The short arm is connected by a link 66 with the short arm of a restoration lever 67, whose longer arm 68 opposite, is in position to be engaged when the spur 37 arrives at the position shown in Fig. 9. Engagement in this position opens the primary switch and leaves it open after each complete revolution of the actuating wheel from its normal starting point shown in Fig. 9.

The secondary switch 52, which is shown closed in Fig. 9 and open in Fig. 11, is actuated by projecting knobs 69 on two opposite prongs of cock 6, so that starting from the positions of Fig. 9 the trip arm 59 will not be engaged by the first quarter turn of cock 6, but will be engaged to open the switch by the second quarter turn of the cock when the actuating spur 37, on its second revolution, arrives at the place shown in Fig. 11. A link 70 connects the link arm 60 with the replace lever, whose longer arm 72 is adapted to engage the spur 37, when passing, to replace the switch, leaving it closed after each complete revolution of the actuating wheel as shown in Fig. 9. The motor current enters by wire 73 which connects with contact strip 54, passes to strip 55 when the primary switch is closed and to strip 56 by connecting wire 74, whence by switch 52, strip 57 and the motor wires 14 and 15 it goes back to source by exit wire 75 as required.

Provision is made for passing the current by the breaks made by switches 51 and 52 independently of direct action so far mentioned. Extra wires 76, lead from the contact strips 54 and 55, and connect with binding posts 77 on contact poles of flexible material 78 as shown in Fig. 4. Likewise, extra wires 79 lead from the contact strips 56 and 57, to binding posts 80 on contact poles 81, which are located directly below poles 78 parallel therewith and the same distance apart. The upper poles depend from an insulating support 82, fastened to a ceiling board 32, which also holds the switch box 33. The lower insulating support 85 rests on and is held by the base of the box. Centrally between the poles a vertically movable rod 86 is guided by the two insulated supports and extends beneath the box where it connects with an actuating extension rod 87, from which it is electrically insulated by a non-conducting coupling 88. The rod 86 carries a contact collar 89, shown as making contact with the two poles 81, and by upward movement it may also make contact with the two poles 78. The extension rod 87 has pivotal connection at its lower end with the operating lever 44 fulcrumed on a bracket 58 depending from the switch box. The lever carries a counterweight 84 at one end and the other end extending beyond the fulcrum a short distance has depending therefrom a sustaining wire 63 from the lower end of which hangs a small water bucket 85. A branch rod 91 extends upward from the fulcrum of the operating lever at right angles thereto and carries near its upper end a bob-weight 92. The extreme end of the branch rod extends a little way through the bob-weight so that its angular movements can be arrested against limiting stops 93 united and supported from the ceiling board 32 on opposite sides of a vertical plane through the fulcrum. When the water bucket is nearly full of water it is supposed to overbalance the counter and bob weights and push the contact collar 89 upwards, breaking contact between poles 81 and making contact between poles 78. The water bucket 85 is supposed to hang near to a basement floor in a recess between the tanks 1 and 2, by which together with brine pipe 28, which conveniently leads up from the bottom of tank 2, the bucket is guided in vertical movement. A small siphon pipe 94 leads from pressure pipe 27 near to its entrance to the top of the brine tank for supplying the bucket with water whenever brine flows for regenerative purpose by reason of hard water pressure on top of the brine through pipe 27. From the bottom of the water bucket a small leakage pipe 95 leads into the sewer pipe 96. A pressure reducer 97 may be connected with pipe 27 as an aid in restricting the flow of brine through the zeolite and giving it time for proper regenerative action. Most any ordinary reducer will answer this purpose, but we have indicated one covered by U. S. Patent No. 1,012,701 issued to myself Dec. 26, 1911.

The automatic operation by means of a motor is as follows: In normal operation while hard water is being softened for daily use the four cocks are set as shown in Figs. 6 and 7 and the position of the actuating wheel, cock prongs and the two main switches are shown in Fig. 9. To start the motor the upper gap in the switch box may be closed by pulling down the sustaining wire 63, or a special by-pass may be used through wires 76 leading to a push button located in any convenient place, but the hand operated by-pass must not remain closed after the motor starts. Immediately after starting to swing around the circle, the wheel spur 37 closes the primary switch 51 which causes continuance of motion until the electric circuit is again broken by engagement between the spur and restoration lever arm 68 at the completion of one complete revolution of the actuating wheel. The effect of this first revolution has already been described, with the exception that it further results in letting water flow into the water bucket 85 through the small branch siphon pipe 94 at a rate which can be regulated by the size of the pipe or by adjusting the pressure reducer 97. While water flows into the bucket it is also flowing out through the leak pipe 95 at a slower rate than it flows in. This rate is permanently fixed by size or obstruction of the leak pipe as it otherwise depends only on gravity flow. Whatever this leakage flow may be, the inflow through the siphon pipe must be sufficient to fill the bucket after sufficient lapse of time to insure the regeneration of the zeolite by the brine. Before the bucket is completely filled the added weight of water suffices to tilt the operating lever 44 and restores the motive current by closing the upper gap in the switch box 33, as has been already described. The actuating wheel now starts again and, after closing the primary switch 51, continues motion until the cocks 4 and 6 are given their second quarter turn restoring these two cocks to their normal position in effect, since a half turn of any of the four cocks restores their normal action. See position of spurs 36 and 37 in Fig. 11, showing the secondary switch 52 just after it has been opened by engagement of the trip arm 59 with a knob 69, on one of the prongs of cock 6, stopping the motor again simultaneously with the restoration of cocks 6 and 4. This restoration shuts off the flow of brine and admits hard water through cock 4, to flow in turn through the zeolite for cleansing purposes as before mentioned. At the same time the supply of water through the siphon pipe 94 which caused the second stoppage of the motor, is cut off and the bucket begins to empty through the leak pipe 95, after the lapse of a few minutes, sufficient for cleansing purposes, before the water bucket is entirely emptied, the operating lever 44 is restored to its normal position by the counterweight 84, and the closing of the lower gap in the switch box turns on the motive current through the secondary by-pass. The actuating wheel now continues on its course until its completed second revolution is stopped by engagement of the restoration lever arm 68 by the spur 37 as it arrives at its original normal position. During the final stage of its journey the spur 37 encountered replace lever arm 72, and reclosed the secondary switch 52, leaving everything ready, after restoring cocks 5 and 7 to their original functions, for a new regenerative action to be started after a few days or weeks of normal use.

The first revolution of the actuating wheel was not interrupted by opening of the secondary switch because there was no actuating knob on the prong of cock 6 which passed the switch when this cock was first actuated, but the following prong which had an actuating knob 69, was brought into position to act when, during the second revolution of the wheel, cock 6 was given a second quarter turn.

Before the operating lever 44 is tilted from the position shown, the bob weight 92 adds resistance to that of the counterweight 84, but after tilting, the bob weight resists the reverse movement of the counterweight to such an extent that while nearly full bucket is required to overcome the combined resistances, most of the water must leak away to allow the reverse movement.

During the long periods when flow of brine is not required for regeneration, cocks 4 and 6 guard against leakage of brine into the hard water, but to make this guard doubly sure the cock 6 in its normal position, provides an air vent 98 to the pressure pipe 27, as shown in Fig. 7. Air is admitted through the one passageway of the cock after passing a protecting strainer 99. This vent facilitates draining off a portion of water from the top of the brine tank through the siphon pipe 94, making it practically an open tank when not in use, which can be opened at any convenient time for inspection or addition of salt as required without previous preparation. The bend in the siphon pipe extends a little above the top of the brine tank and the air vent is a little higher still so that no excusable amount of leakage past cocks 4 or 6 could cause an overflow of brine, which in any event would go to the sewer instead of contaminating the water supply.

We have chosen to send the brine and cleansing water through the zeolite bed in a reversed direction of the flow during normal use, but others have preferred not to reverse the flow for the purpose of regeneration and cleansing. Neither is the flow of hard water necessarily upwards through the zeolite. Others prefer the downflow of water during the softening process. The inflow and outflow pipes may be connected to either the top or bottom of the zeolite tank as preferred.

Instead of a large brine tank some users prefer a small brine pot which holds only enough brine for a single regenerating operation. In this case it is not necessary to turn the brine off before turning cleansing water on, as the hard water which drives the brine necessarily will follow it for cleansing, if not cut off. Therefore, during its second revolution the actuating wheel does not need to have its continuous motion interrupted for cleansing purposes when hand operated. Both revolutions of the actuating wheel may be continuous but the interval between the two necessary complete revolutions should be long enough to allow for both regeneration and cleansing. For automatic operation with the motor, the operation will be the same whether the brine tank is reduced to the size of a pot or made to hold a season's supply.

I claim:

1. Circulation-controlling means for water-softening apparatus consisting of a series of service cocks having parallel axes laterally removed from each other, a passageway for fluid through each cock, multiple ports adapted to be alternately opened and closed at successive partial revolutions of the cock, multiple prongs on each cock numerically related to the ports, pipes for conveying fluid to and from the several ports, an actuating wheel whose axis is located centrally between and parallel to the axes of the cocks, a spur attached to the periphery of the actuating wheel whereby the cock prongs are successively engaged and given proper angular rotation by each passage of the spur and means for rotating said wheel in one direction as required.

2. Circulation-controlling means for water-softening apparatus consisting of a series of service cocks having axes parallel to each other, a passage-way for fluid through each cock, multiple ports alternately opened and closed by partial successive revolutions of the cock in one direction, pipes for conveying fluid to and from the several ports, multiple prongs attached to each cock numerically related to said ports, an actuating wheel whose axis is parallel to the axes of the cocks at a remote lateral distance, a spur secured to the periphery of the actuating wheel whereby at each revolution of the wheel each cock prong is given a partial rotation as required and means whereby the actuating wheel is revolved in the one direction at intervals as required.

3. The combination with a series of cooperative cocks having parallel axes and diametric passage-ways for fluid adapted to register successively with multiple ports, of radial prongs attached to each cock in definite angular relation to said ports, an actuating wheel carrying at its periphery a projecting spur adapted to engage said prongs to give the cocks partial rotation at each revolution of the wheel, and means for giving complete or partial rotation to the actuating wheel always in the same direction at intervals as required.

4. The combination with a series of cooperative cocks arranged in pairs whose members are axially separated in line with each other, a passage-way for fluid through each cock and multiple ports adapted to register successively with said passage-way, of radial prongs attached to each cock at angular intervals corresponding to said ports, an actuating wheel located in the space between the axially separated individual cocks on an axis laterally remote from that of the pairs of cocks, a spur carried at the periphery of the actuating wheel to engage and partially rotate each cock once during a revolution while the spur is passing and means whereby the wheel is given complete or partial revolutions one way only as required at intervals.

5. The combination with a series of cocks arranged in pairs whose axes are in line with each other, each cock having a diametric passage-way for fluid and multiple ports of registration for each cock, of radial prongs attached to each cock at definite angular relations to said ports, an actuating wheel located in a plane between the individual cocks on either side thereof whose axis is located remotely from those of the cocks in a lateral direction, a spur carried by the periphery of the actuating wheel to engage the cock prongs on either side of the wheel plane and give each prong a partial rotation for change of function and means whereby the wheel is made to revolve always in the same direction at intervals as required.

6. The combination with a series of cooperative service cocks arranged in coaxial pairs dividing their individual members between two separate parallel planes of revolution and having diametric passage-ways for fluid adapted to register successively with multiple ports, of prongs attached to each cock numerically related to said ports, an actuating wheel located between the two planes of revolution, a spur carried on the periphery of said wheel to engage on either side and rotate in succession the cock prongs through partial rotations for change of function, and means for giving occasional rotation to the actuating wheel in one direction only as required.

7. The combination with two conically tapering coaxial service cocks having separate planes of parallel revolution and corresponding conical sleeve seats provided with circumferential ports adapted to register successively with a diametric passage-way through the cocks, of a helical spring axially located between the two cocks thrusting them mutually against their respective seats, radial prongs attached to each cock with angular spacing corresponding to said ports, an actuating wheel located between the two sets of prongs, a spur carried on the periphery of the actuating wheel adapted to engage the cock prongs on either side thereof to give them simultaneous partial rotation for each change of function, and means whereby said wheel is actuated to revolve without change of direction at intervals as desired.

8. The combination with a series of cooperative service cocks requiring coordinated intermittent changes of function through partial successive rotations, of an actuating wheel adapted to impart to each service cock one partial rotation during each complete revolution of said wheel and means whereby the actuating wheel may be controlled to revolve either completely or partially always in the same direction as the service may require.

9. Circulation-controlling means for water-softening apparatus consisting of a series of cooperative service cocks requiring coordinated intermittent changes of function through partial successive rotations, an actuating wheel adapted to impart to each service cock a partial rotation during each complete revolution of said wheel, an electric motor capable of driving the actuating wheel in one direction only, a primary current switch which is closed and opened by the actuating wheel at each complete revolution of the wheel, after the current is first turned on, so as to arrest motion on completion of each revolution, a secondary switch which is opened and closed by the actuating wheel only during alternate revolutions, a bucket suspended from an operating lever adapted to close a primary by-pass around the primary switch when the bucket fills with water, a supply pipe for admitting water gradually to the bucket when turned on during the first revolution of the actuating wheel, a permanent aperture at the bottom of said bucket for slow waste of water, a secondary by-pass, which closes when the bucket loses water to restart the motor after interruption by the secondary switch, and means whereby current is first turned on to the motor to start automatic completion of action.

10. Circulation-controlling means for water-softening apparatus consisting of a series of cooperative service cocks requiring coordinate intermittent changes of function by partial rotations and an actuating wheel adapted to impart to each service cock a partial rotation during each complete revolution of said wheel, with a motor capable of driving the actuating wheel in one direction only, a primary current switch which is closed and opened by the actuating wheel during each complete revolution for maintenance and stoppage of the motive power after the current is first turned on, a bucket suspended from an operating lever adapted to close a by-pass around the primary switch when the bucket fills with water, a supply pipe for gradually filling the bucket with water when turned on during the first revolution of the actuating wheel, a permanent aperture at the bottom of the bucket for slow waste of water and retarding the filling, a secondary switch adapted to interrupt alternate revolutions of the actuating wheel, a secondary by-pass which closes whenever the bucket is emptied of water, for restarting motion of the wheel after interruption by the secondary switch, a replacement lever to close the secondary switch and means whereby the current is first turned on to the motor to start automatic completion of action.

11. Circulation-controlling means for water-softening apparatus consisting of a series of cooperative service cocks requiring co-ordinated intermittent changes of function through partial successive rotations, an actuating wheel adapted to impart to each service cock a partial rotation during each complete revolution of said wheel, means for controlling said service cocks, including a motor for driving said actuating wheel in one direction only, a primary current switch which is closed immediately after the current has initially started said motor and opened by the actuating wheel at the completion of each revolution so as to arrest motion at the completion of each revolution, a secondary switch which is opened and closed by the actuating wheel during alternate revolutions, and means adapted to close a primary by-pass around the primary switch after a predetermined period after the actuating wheel has rotated a complete revolution for rotating said actuating wheel through a portion of another revolution and arresting its motion at the completion of said partial revolution, and after a second predetermined period, said last mentioned means being adapted to operate a secondary by-pass which closes the motor circuit to restart the motor after interruption by the secondary switch for rotating said service cocks to their original functioning positions.

12. In the combination defined in claim 11, said cock-controlling means being adapted to automatically complete the successive changes of operating positions of the service cocks after initially starting the motor.

13. In a fluid circulating system, a series of cooperative service cocks providing for intermittent changes of function through successive partial rotations, actuating means for imparting such partial rotations to each of said service cocks in definite order, timing means for interrupting and rendering said actuating means inoperative for a predetermined period, and means operable at will for initially setting said actuating means in operation.

14. In the combination defined in claim 13, said actuating means being constructed and arranged to selectively operate certain service cocks of the series in successive order.

15. In a fluid circulating system, a series of cooperative service cocks providing for intermittent changes of function through successive partial rotations, actuating means adapted to impart partial rotations to said cocks in a definite successive order, means operable at will for initially starting said actuating means in motion, and timing means adapted to interrupt and render said actuating means inoperative for a plurality of predetermined periods of time, said actuating means being adapted to automatically arrest itself after the service cocks have completed a cycle of operation.

THOMAS O. PERRY.